United States Patent [19]

Takai

[11] Patent Number: 4,539,610
[45] Date of Patent: Sep. 3, 1985

[54] PACK GUIDE MECHANISM

[75] Inventor: Kazuki Takai, Tokyo, Japan

[73] Assignee: Clarion Co., Ltd., Tokyo, Japan

[21] Appl. No.: 564,857

[22] Filed: Dec. 23, 1983

[30] Foreign Application Priority Data

Dec. 24, 1982 [JP] Japan ................. 57-226251
Dec. 24, 1982 [JP] Japan ................. 57-226252
Dec. 24, 1982 [JP] Japan ................. 57-226253

[51] Int. Cl.³ ............... G11B 5/008; G11B 15/00
[52] U.S. Cl. ......................... 360/93; 360/96.5
[58] Field of Search .......... 360/93, 96.5, 137, 71, 360/90, 105; 242/192, 197, 55.19 A

[56] References Cited

U.S. PATENT DOCUMENTS 4,071,858  1/1978  Ejiri ............................. 360/93
4,161,007  7/1979  Haraguchi ...................... 360/137
4,202,021  5/1980  Nagase .......................... 360/93
4,257,075  3/1981  Wysocki ........................ 360/96.5
4,345,283  8/1982  Maryschka ..................... 360/137
4,377,829  3/1983  Kamimura ...................... 360/93

Primary Examiner—Robert M. Kilgore
Attorney, Agent, or Firm—Flynn, Thiel, Boutell & Tanis

[57] ABSTRACT

A tape pack guide mechanism, wherein a guide arm is so disposed that its extremity can pivot in the vertical direction around a pivot axle mounted at the back part of a tape player; wherein the extremity of the guide arm is connected to a pack guide which moves up and down; wherein this guide arm supports at least one stick shaped thrust piece, an extremity of which extends into the pack guide, whereby this thrust piece is so designed that, when the pack guide goes downwardly, it pushes on an upper side of a pack in the pack guide and, when the pack guide goes upwardly, it thrusts the pack guide against stoppers disposed adjacent a housing opening for introducing the tape pack.

9 Claims, 4 Drawing Figures

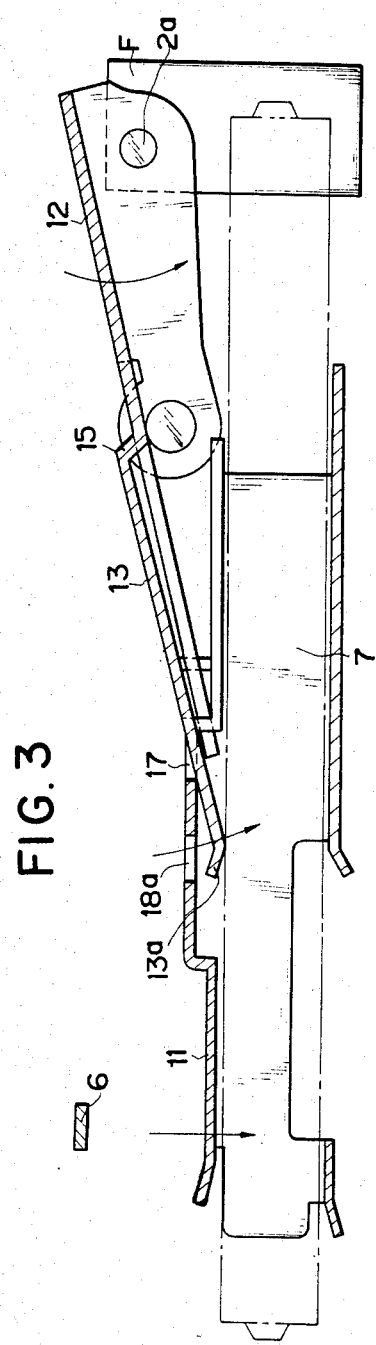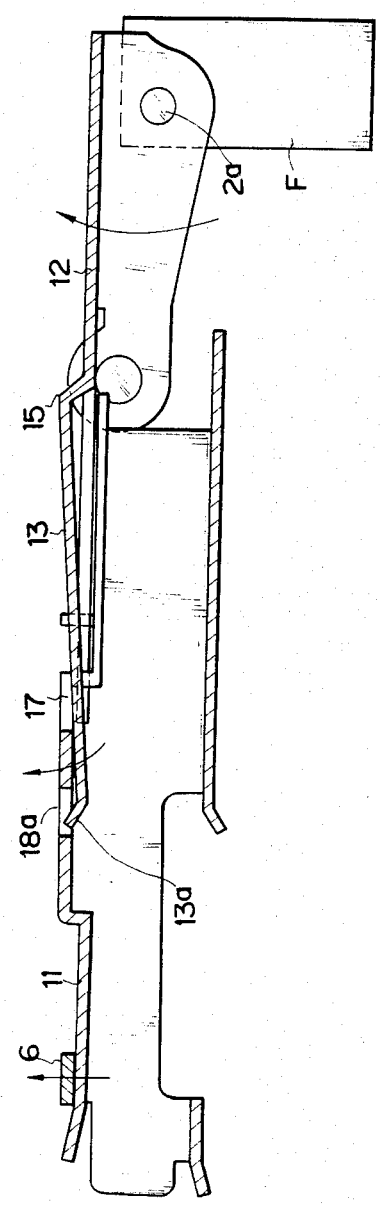

PACK GUIDE MECHANISM

FIELD OF THE INVENTION

This invention relates to a tape pack guide mechanism for a tape player, and more particularly to an improvement of the connecting portion of a pack guide and a guide arm supporting it.

BACKGROUND OF THE INVENTION

A cassette type tape player is set placed in a playing state such as reproduction and recording by inserting two reel axles standing upright on the base plate into holes disposed for the axles in a tape pack.

As loading means for such a pack, several different types are known, depending upon the direction of the pack introduction with respect to the tape player. One of these types, which is widely utilized for car stereo devices, is a so-called horizontal loading type, in which a pack is horizontally introduced through an opening formed at the front of the tape player into the inside of the pack guide and then the reel axles are inserted in the pack by moving down the whole pack guide to the reel base.

Loading and unloading of the pack in such a tape player are effected by combination action of the pack guide, into which a whole pack has been introduced, moving vertically and a guide arm pivoting in the vertical direction while supporting this pack guide.

That is, an indicated in FIG. 1, the pack guide 1 is supported by the right end or extremity of the guide arm 2 pivoting around a pivot axle 2a mounted on the frame F. A pin 3 projecting toward the outside is disposed at a part of the guide arm 2, which is on the opposite side to the pivot axle 2a, and the pin 3 slides in contact with a cam 5 having a step of an eject holding plate 4, which is freely horizontally movable forward and backward in the tape player. On the other hand, 6 are disposed at the right and left sides, respectively, over the front end of the pack guide 1, corresponding to the location of the opening for introducing a pack which is formed in the escutcheon of the tape player, and this defines the upper limit for the vertical displacement of the pack guide 1.

In such a pack guide mechanism, when a pack 7 is introduced into the pack guide 1, a pack stopper (not shown) disposed at the center of the guide arm 2 moves toward the inner part of the tape player, and the eject holding plate 4 is pushed out forwardly in combination with this movement of the pack stopper. Then, the pin 3 disposed on the guide arm reaches the lower part of the step of the cam 5 formed on the eject holding plate 4, and the guide arm 2 pivots around the pivot axle 2a supported by the frame F so that its left end or extremity goes down. As a result, the pack guide 1 connected with the extremity of the guide arm 2 goes downwardly while being held horizontally together with the pack 7 introduced in it, and thus the tape player is placed in the playing state such as reproduction and recording.

However, since, in the prior art pack mechanism is indicated in FIG. 1, the pack guide 1 is formed so as to be larger than the pack 7 so that the pack 7 can be easily introduced in it, the pack 7 tends to be deviated in within the pack guide 1 when moved down for recording or reproduction. Specifically, when the pack 7 is movable in the vertical direction in the pack guide 1, displacement can be produced between the pack and the head. By this fact, recording or reproduction cannot be effected smoothly and consequently reliability of the tape player is markedly lowered.

Furthermore, in a horizontal loading type tape player as indicated above, positioning of the pack guide 1 at the moment of loading or ejection of the pack is assured by the stoppers 6 disposed on the main body or housing of the tape player. However, in the prior art pack guide supporting mechanism as indicated in FIG. 1, if there was no play in the connecting part between the pack guide 1 and the guide arm 2, unless these two parts were connected with very high precision, there was the risk that deviation would be produced between the highest position of the pack guide and the stoppers 6. Further, these were inconveniences in that, for example, if the pack guide 1 is mounted too high, either the pack guide 1 when raised up to the position for ejection collides too strongly with the stoppers 6 such that pack guide itself or the stopper can be damaged, or that the pack guide 1 collides with the stoppers 6 before the guide arm 2 is fully raised and thus the guide arm 2 cannot be held at the upper position, because the pin 3 of the guide arm cannot be engaged with the higher part of the cam 5 in the eject holding plate. To the contrary, there was another drawback in that, when the connecting part of the pack guide 1 is too low, even if the guide arm 2 is fully raised, the pack guide 1 is not raised to collide with the stoppers 6, and consequently the pack ejected from the inside of the pack guide is prevented from moving out of the opening in the escutcheon for introducing the pack. On the other hand, there were other inconveniences in that, if the connection of the pack guide 1 with the guide arm 2 is too loose, play is produced between them, and the pack guide 1, which is raised to the higher position, trembles due to external oscillation; unnecessary contact with the stoppers 6 is repeated; and unusual noise is produced by trembling. However, it is not desirable to improve the precision of the connecting part between the pack guide 1 and the guide arm 2, because it requires much time and work for manufacturing and mounting of each part for the pack guide mechanism.

OBJECT OF THE INVENTION

This invention has been made in order to eliminate these drawbacks of the prior art pack guide mechanism as described above, and an object of this invention is to provide a pack guide mechanism having an improved function for holding a pack in the pack guide during recording and reproduction and to improve the precision of the tape player and at the same time to obtain precise positioning of the pack guide without increased mounting precision of the pack guide and the guide arm.

SUMMARY OF THE INVENTION

In order to achieve this object, a pack guide mechanism according to this invention includes at least one stick shaped thrust piece formed, preferably integrally on the guide arm, an extremity of which is inserted into the pack guide, whereby, for positioning the pack, this thrust piece is so designed so that, when the pack guide goes downwardly, it pushes from the upper side the pack in the pack guide, and when the pack guide goes upwardly, it thrusts the pack guide against stoppers disposed at the upper part of the opening for introducing the pack.

BRIEF DESCRIPTION OF THE DRAWINGS

FIG. 3 is a cross-sectional view of the pack guide mechanism according to this invention, when a pack is loaded; and FIG. 4 is a cross-sectional view of the same mechanism, when the pack is ejected.

DETAILED DESCRIPTION

Figure 1:
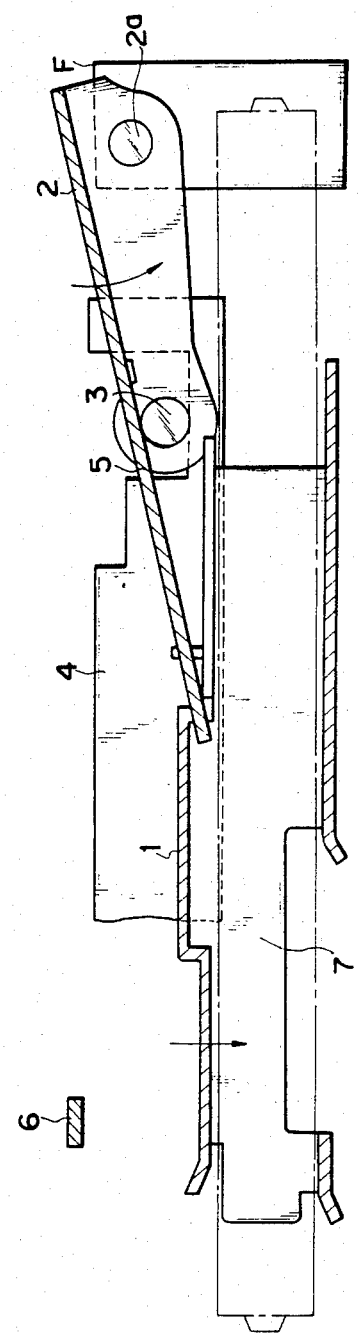
FIG. 1 is a cross-sectional view showing a prior art pack guide mechanism.
Figure 2:
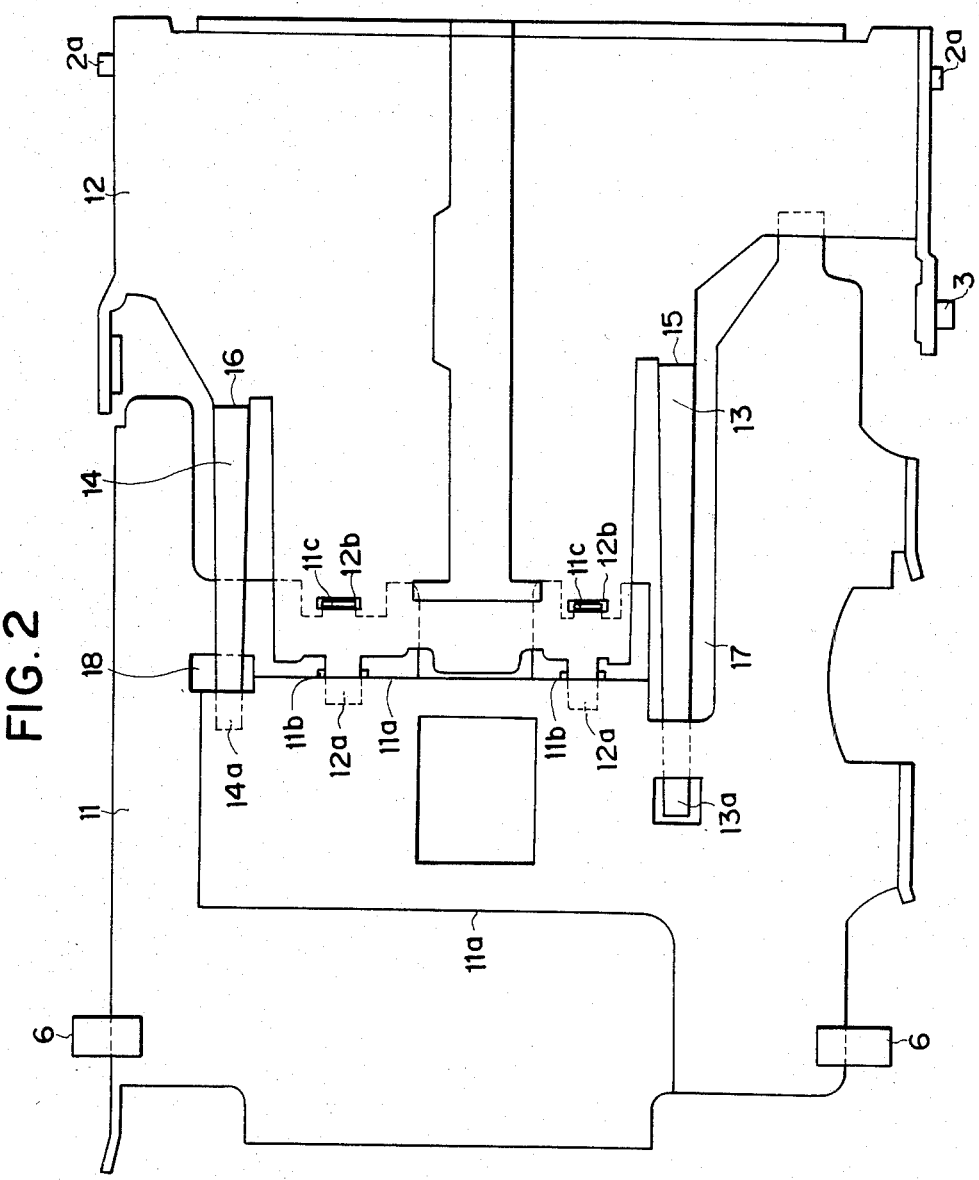
FIG. 2 is a plan view showing a pack guide and a guide arm used in a pack guide mechanism according to this invention.

Hereinbelow an embodiment according to this invention will be explained reference to FIGS. 2 and 3. The referring numerals used in FIG. 1 will not be explained, because they denote the same parts as those indicated in FIG. 1.

In this embodiment, the pack guide 11 and the guide arm 12 are connected by the fact that a projection 12a, which is at the left end or extremity of the guide arm, is inserted into a hole 11b formed in the vertical face of a step 11a disposed on the upper surface of the pack guide 11, and that a projection 11c of the pack guide 11 is inserted from the lower side into a hole 12b formed in the guide arm 12. Two stick shaped thrust pieces 13 and 14 are formed at the left and right sides, respectively, as indicated in FIG. 2, and extend the pack guide 11 from the guide arm 12. These thrust pieces 13 and 14 are provided with steps at their base parts 15 and 16, respectively, so that they are situated a little higher than the upper surface of the guide arm 12. Further the thrust pieces 13, 14 extend under an upper face plate of the pack guide 11 and their extremity or end portions 13a, 14a are bent upwardly. On the other hand, in the pack guide 11, a recess 17 and a hole 18 are so formed that the thrust pieces 13, 14 can extend into the pack guide them, and also a hole 18a is formed, which cooperates with the extremity portion 13a of the thrust piece 13.

In the pack guide mechanism according to this embodiment, as indicated in FIG. 3, when the pack guide 11, in which the pack 7 is introduced, goes down to the position for recording and reproduction, the guide arm 12 pivots around the pivot axle 2a so that its left end or extremity goes down. At the same time the end portions 13a and 14a of the thrust pieces 13, 14 disposed on this guide arm leave the upper face plate of the pack guide 11 and go down. Thus they can fix rigidly the pack 7, pressing it downwardly from the upper side. In this way, even if the pack guide 11 is slightly larger than the pack 7, it cannot be deviated in the pack guide 11 and thus playing operation such as recording and reproduction can be effected smoothly. At this time, the extremity portions 13a, 14a of the thrust pieces, which are bent upwardly, are in a substantially horizontal state along the surface of the pack and press the pack downwardly.

Furthermore, in the pack guide mechanism according to this embodiment, at the moment of ejection of the pack, as indicated in FIG. 4, since the thrust pieces 13, 14 of the guide arm 12 push upwardly on an engaging portion of the upper face plate, the pack guide is elastically energized upwardly. That is, at the moment of ejection, the pack guide 11 is raised by the spring force of the thrust pieces 13, 14 and held at the location where they are in contact with the stopper 6. In this way, even if there is vertical play in the connection between the pack guide 11 and the guide arm 12, since the pack guide 11 is always in a precise position defined by the thrust pieces 13, 14, loading and unloading of the pack can be effected smoothly. Furthermore, since play is more or less allowed in the connecting part between the pack guide 11 and the guide arm 12, production steps for these pieces are simplified.

Moreover, since the thrust pieces 13, 14 mounted on the guide 12 can be integrally formed cutting a part of the guide arm 12 and raising it, fabrication cost is lowered and the production process is simplified.

As explained above, according to this invention, it is possible to obtain a pack guide mechanism preventing deviation of the pack in the pack guide, elevating the precision of the tape player and at the same time providing precise positioning of the tape guide.

I claim:

1. A tape player having a tape pack guide mechanism which comprises:
   an elongate guide arm supported at one end for pivotal movement around a pivot axis disposed in the tape player so that its other end moves generally vertically;
   a pack guide supported for substantially vertical movement in the tape player between an upper position and a lower position and adapted to have a tape pack inserted therein;
   connecting means cooperable with said other end of said guide arm for operatively connecting said guide arm to an upper part of said pack guide;
   at least one thrust piece supported on said guide arm and extending to a location inside said pack guide so that an end portion of said thrust piece is positioned on a side of said connecting means remote from said pivot axis; and
   an engaging portion formed on said pack guide and adapted to engage said end portion of said thrust piece when said pack guide is in its upper position;
   wherein when said pack guide is in its lower position said thrust piece engages an upper side of a tape pack in said pack guide and urges it downwardly, and wherein when said pack guide is in its upper position said thrust piece engages said engaging portion of said pack guide and urges said pack guide against stoppers which are provided on a housing of said tape player and are adjacent an opening in said housing through which a tape pack can be inserted into said pack guide.

2. The tape player according to claim 1, wherein said guide arm is made of sheet metal and said thrust piece is a bent portion of said guide arm.

3. The tape player according to claim 1, wherein said thrust piece is a resilient plate supported on said guide arm.

4. The tape player according to claim 1, wherein said connecting means permits a small amount of vertical play between said pack guide and said other end of said guide arm.

5. The tape player according to claim 1, wherein said connecting means pivotally couples said other end of said guide arm to said upper part of said pack guide.

6. The tape player according to claim 5, wherein said upper part of said pack guide includes a platelike member which is bent to have a generally vertically extending step portion, and wherein said connecting means includes said upper part of said pack guide having a hole in said vertically extending step portion thereof and said guide arm having a projection which extends through said hole in said step portion.

7. The tape player according to claim 6, wherein said connecting means includes a hole provided in said guide arm and an upright projection on said upper part of said pack guide which extends upwardly into said hole in said guide arm.

8. The tape player according to claim 6, including means defining a further hole in said upper part of said pack guide, wherein said thrust piece is a resiliently flexible, platelike portion of said guide arm which extends through said further hole in said upper part of said pack guide.

9. The tape player according to claim 8, wherein said thrust piece has an outermost end which is bent upwardly.

* * * * *